(12) United States Patent
Tamura et al.

(10) Patent No.: US 12,024,255 B2
(45) Date of Patent: Jul. 2, 2024

(54) STRADDLE TYPE VEHICLE

(71) Applicant: KAWASAKI JUKOGYO KABUSHIKI KAISHA, Hyogo (JP)

(72) Inventors: Hiroshi Tamura, Kobe (JP); Takeshi Kashihara, Kobe (JP); Kiyotaka Akagi, Kobe (JP); Juichi Oyanagi, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 272 days.

(21) Appl. No.: 17/401,983

(22) Filed: Aug. 13, 2021

(65) Prior Publication Data

US 2022/0055709 A1  Feb. 24, 2022

(30) Foreign Application Priority Data

Aug. 21, 2020 (JP) ................... 2020-140016

(51) Int. Cl.
*B62J 50/21* (2020.01)
*B62J 50/22* (2020.01)

(52) U.S. Cl.
CPC ............. *B62J 50/225* (2020.02); *B62J 50/22* (2020.02)

(58) Field of Classification Search
CPC ................................ B62J 50/225; B62J 50/22
See application file for complete search history.

(56) References Cited

U.S. PATENT DOCUMENTS

| | | | |
|---|---|---|---|
| 8,506,000 B2 * | 8/2013 | Hasegawa | B62J 50/22 296/70 |
| 9,039,258 B2 * | 5/2015 | Noguchi | B62K 19/40 362/477 |
| 9,663,170 B2 * | 5/2017 | Kunisada | B62J 6/027 |
| 10,189,526 B2 * | 1/2019 | Wada | B62J 6/026 |
| 10,742,933 B2 * | 8/2020 | Noguchi | G01S 19/24 |
| 11,059,539 B2 * | 7/2021 | Hariu | B62K 19/30 |
| 2005/0006169 A1 | 1/2005 | Michisaka et al. | |
| 2014/0063826 A1 | 3/2014 | Noguchi | |
| 2021/0107583 A1 * | 4/2021 | Sawada | B62K 27/16 |

FOREIGN PATENT DOCUMENTS

| | | |
|---|---|---|
| JP | 3079175 | 8/2001 |
| JP | 2005-28981 | 2/2005 |
| JP | 2014-46850 | 3/2014 |

* cited by examiner

*Primary Examiner* — Kevin Hurley
*Assistant Examiner* — Michael R Stabley
(74) *Attorney, Agent, or Firm* — Wenderoth, Lind & Ponack, L.L.P.

(57) ABSTRACT

A straddle type vehicle includes a meter display device that displays a vehicle state, a meter panel that forms an outer shell covering the periphery of the meter display device, and a meter support member that supports the meter display device on a vehicle body frame. The meter support member includes a main body disposed below the meter panel, supporting the meter display device, and attached to the vehicle body frame, and an exposed portion joined to the main body, exposed above the meter panel, and disposed around the meter display device.

10 Claims, 9 Drawing Sheets

STRADDLE TYPE VEHICLE

CROSS-REFERENCE TO RELATED APPLICATIONS

The present application claims priority of Japanese Patent Application No.: 2020-140016 filed on Aug. 21 2020, the content of which is incorporated herein by reference.

BACKGROUND OF THE INVENTION

Field of the Invention

The present invention relates to a straddle type vehicle.

Description of the Related Art

A meter display device that displays a vehicle state or the like is disposed forward of a handlebar (see, for example, JP 2014-046850 A). An accessory, which is an add-on part attached after purchase of the straddle type vehicle, may be mounted on the handlebar (see, for example, JP 3079175 U).

However, in a straddle type vehicle, the configuration around a meter display device may be too complicated to allow an accessory to be mounted to a handlebar.

SUMMARY OF THE INVENTION

An object of the present invention is to provide a straddle type vehicle having a simple configuration around a meter display device to allow an accessory to be mounted.

An aspect of the present invention provides a straddle type vehicle including a meter display device configured to display a vehicle state, a meter panel forming an outer shell covering a periphery of the meter display device, and a meter support member configured to support the meter display device on a vehicle body frame, where the meter support member includes a main body disposed below the meter panel, supporting the meter display device, and attached to the vehicle body frame, and an exposed portion joined to the main body, exposed above the meter panel, and disposed around the meter display device.

According to the aspect of the present invention, the exposed portion of the meter support member can be used as an accessory mount portion to which the accessory is additionally mounted after purchasing the vehicle, and the configuration around the meter display device can be simplified as compared with a case where a support member for attachment is additionally provided around the meter display device.

In one aspect of the present invention, the main body of the meter support member has a pair of outer frame portions on both outer sides, regarding the vehicle width direction, of the meter display device and extends in the up-down direction, and the exposed portion of the meter support member is in a bar-shape and includes the portion extending in the vehicle width direction and portions in both sides, regarding the vehicle width direction, extending downward to be joined to a pair of outer frame portions below the meter panel.

According to this aspect, the exposed portion of the meter support member extends in the vehicle width direction, and both sides thereof, regarding the vehicle width direction, are joined to a pair of outer frame portions of the main body of the meter support member, so that both sides, regarding the vehicle width direction, of the exposed portion of the meter support member extending in the vehicle width direction can be supported. Thus, support rigidity can be enhanced as compared with a case where the exposed portion of the meter support member is supported by one side thereof, regarding the vehicle width direction.

In one aspect of the present invention, both sides of the exposed portion, regarding the vehicle width direction, are each inclined outward, regarding the vehicle width direction, toward the lower side.

According to this aspect, both sides, regarding the vehicle width direction, of the exposed portion of the mater support member are inclined outward, regarding the vehicle width direction, toward the lower side, so that, as compared with a case where both sides, regarding the vehicle width direction, of the exposed portion are not inclined outward, regarding the vehicle width direction, toward the lower side, the length of the central portion, regarding the vehicle width direction, of the exposed portion extending in the vehicle width direction is short. This simplifies the configuration around the meter display device. When the accessory is mounted to the central portion, regarding the vehicle width direction, of the exposed portion of the meter support member and thereby a load acts on the exposed portion, the bending moment acting on both sides, regarding the vehicle width direction, of the exposed portion is small, which means that deformation of the exposed portion of the meter support member is effectively suppressed.

In one aspect of the present invention, the outer frame portions and the exposed portion can be in bar-shapes having the same cross section.

According to this aspect, since the outer frame portions and the exposed portion of the meter support member are in bar-shapes having the same cross section, the outer frame portions and the exposed portion can be integrally formed by bending a bar-like member having a constant cross section. Thus, as compared with a case where the outer frame portions and the exposed portion of the meter support member are separately formed and then joined, the number of parts and the number of attaching steps can be reduced.

In one aspect of the present invention, the exposed portion includes a pair of protruding portions that extend upward beyond the meter panel from the joints where a pair of outer frame portions of the main body and a pair of protruding portions join, and an extension portion that is bent from a pair of protruding portions and extends in a direction orthogonal to the up-down direction, and the meter panel has the cutouts through which a pair of protruding portions penetrates in the up-down direction, and an overlapping portion that overlaps the extension portion in the up-down direction.

According to this aspect, the overlapping portion hinders the space below the meter panel from being seen from the upper side thereof, as compared with a case where a cutout through which a pair of protruding portions and the extension portion of the exposed portion penetrate in the up-down direction is provided, and thus the external appearance may be improved.

In one aspect of the present invention, the cutouts of the meter panel are opened to the front side of the meter panel.

According to this aspect, since the cutouts of the meter panel are opened to the front side of the meter panel, the protruding portions of the exposed portion of the meter support member can be set in the cutouts of the meter panel from the front side of the meter panel, and thus the work of attaching together the meter support member and the meter panel can be performed easily. With regard to setting the protruding portion of the exposed portion of the meter support member in the cutout of the meter panel, the size of the cutout of the meter panel can be made small, as compared with a case where the meter panel is provided with cutouts through which a pair of protruding portions and the extension portion of the exposed portion of the meter support member penetrate in the up-down direction.

In one aspect of the present invention, the meter panel includes a visor that is provided above the meter display device and protrudes upward further than the displaying face of the meter display device in the normal direction of the displaying face. The exposed portion is separately disposed above the visor, and is disposed further in the front side than the rear end of the visor.

According to this aspect, where the visor is provided to improve visibility of the displaying face of the meter display device, a space for mounting the accessory is readily provided and, at the same time, deterioration in visibility caused by disposing the exposed portion of the meter support member closer to the rider than the visor of the meter panel can be prevented.

In one aspect of the present invention, the meter panel includes the visor that is provided above the meter display device and protrudes upward further than the displaying face of the meter display device in the normal direction of the displaying face, the visor protrudes in a trapezoidal shape, and the exposed portion is formed in a trapezoidal shape separately along the periphery of the visor.

According to this aspect, since the meter panel is provided with the visor above the meter display device, and the exposed portion of the meter support member is formed in a trapezoidal shape separately along the periphery of the visor, a space for mounting the accessory can be provided and at the same time degradation of external appearance of the exposed portion of the meter support member can be suppressed. However, the positional relationship between the meter panel and the visor is not limited to the configuration described above.

According to the straddle type vehicle according to the present invention, it is possible to simplify configuration around a meter display device to allow an accessory to be mounted.

DETAILED DESCRIPTION OF THE INVENTION

Hereinafter, embodiments of the present invention will be described with reference to the accompanying drawings.

Figure 1:
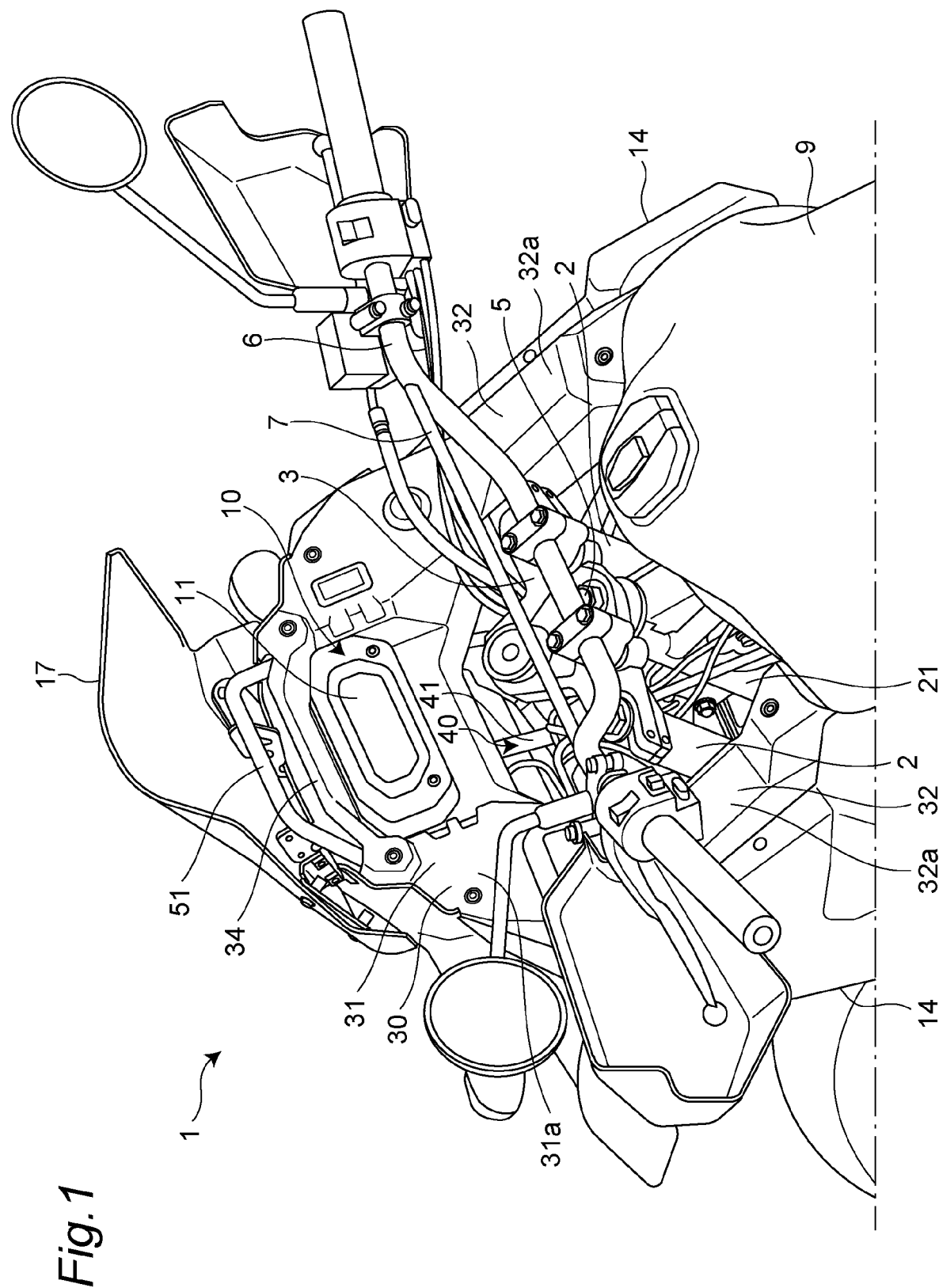
FIG. 1 is a perspective view illustrating a front portion of a motorcycle according to an embodiment of the present invention.
Figure 2:
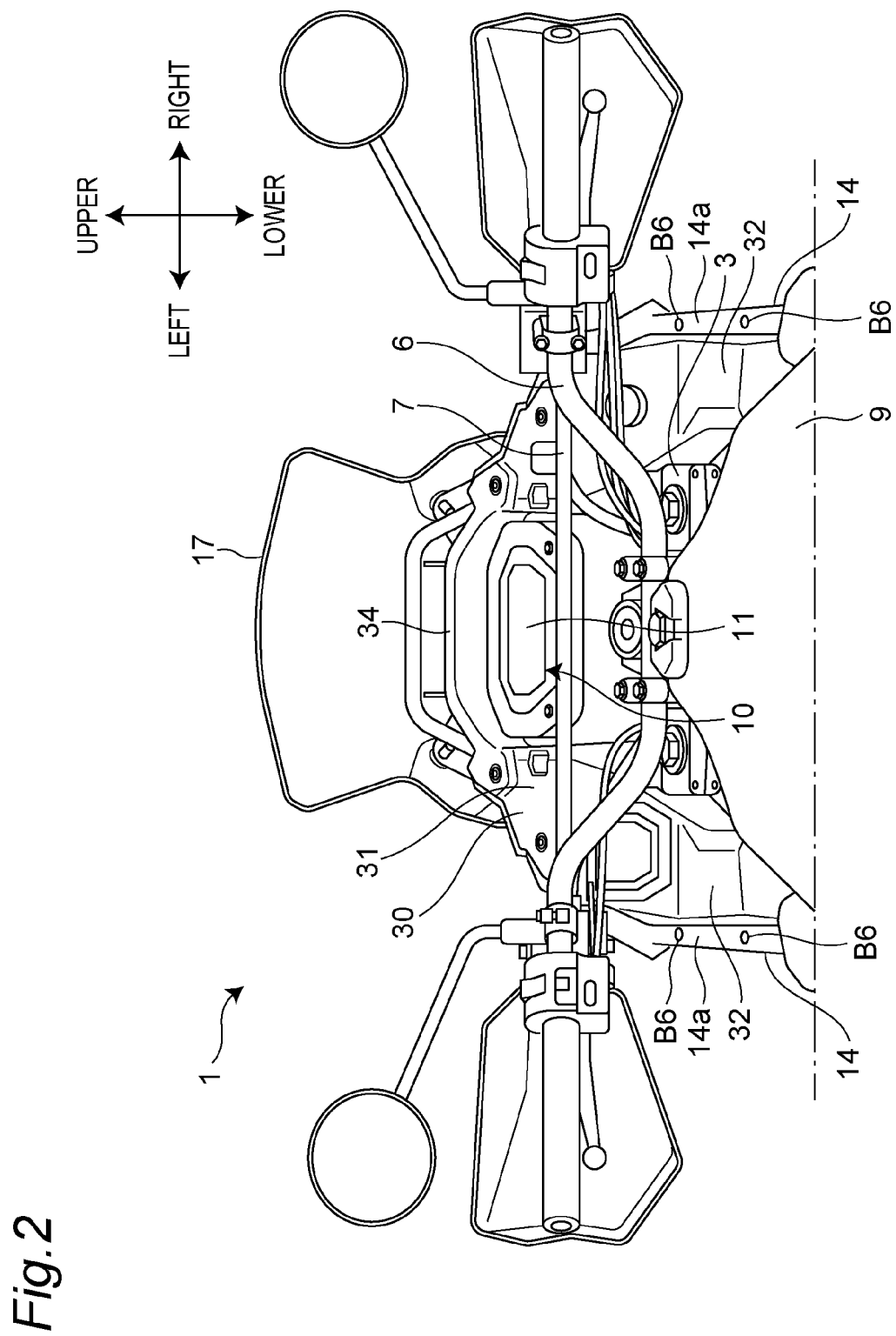
FIG. 2 is a rear view illustrating the front portion of the motorcycle.
Figure 3:
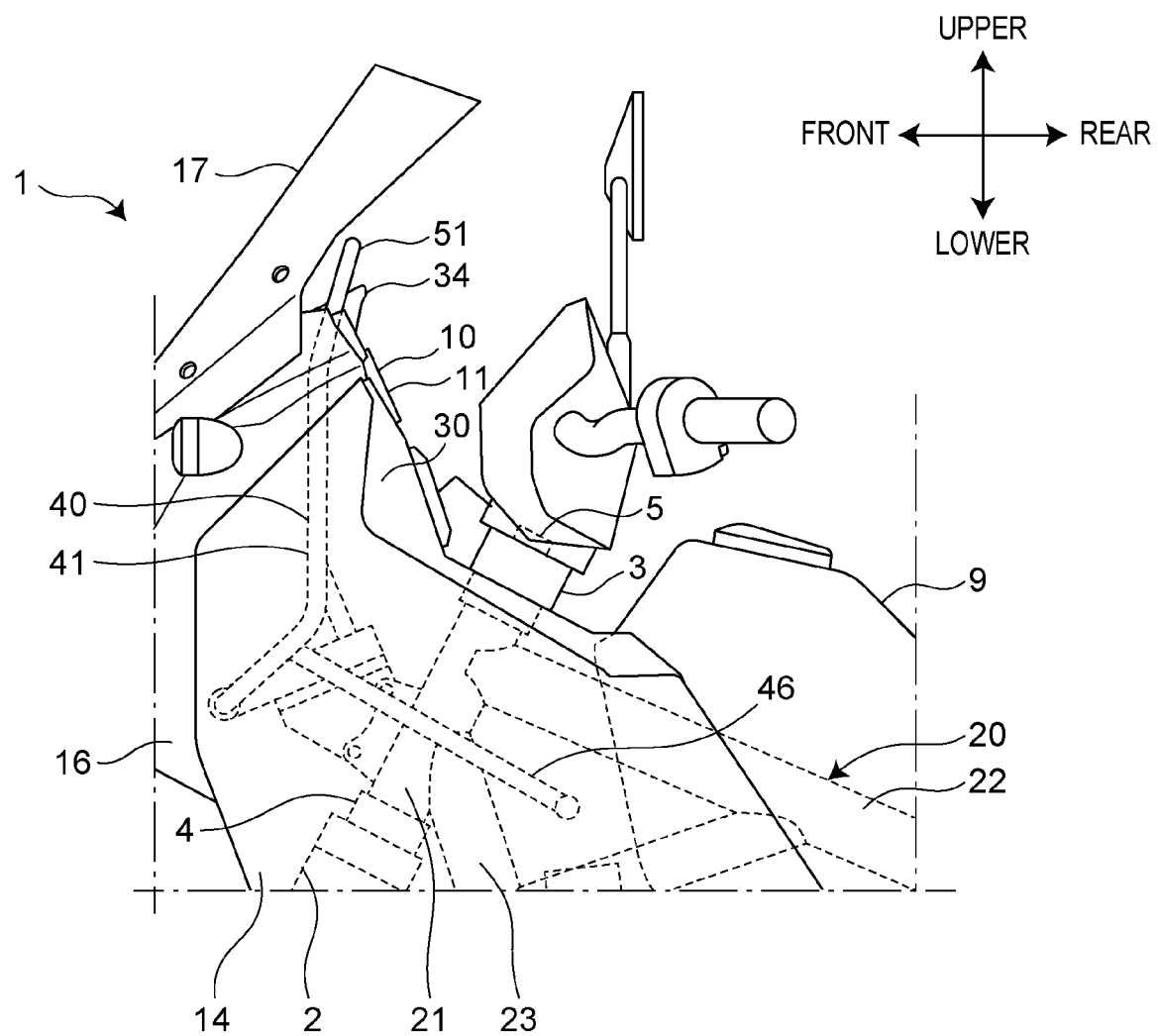
FIG. 3 is a side view illustrating the front portion of the motorcycle.

FIG. 1 is a perspective view illustrating a front portion of a motorcycle according to an embodiment of the present invention. FIG. 2 is a rear view illustrating the front portion of the motorcycle. FIG. 3 is a side view illustrating the front portion of the motorcycle. Note that, in the present specification, "front", "rear", "left", and "right" respectively indicate the front direction, the rear direction, the left direction, and the right direction as viewed from a rider riding the vehicle.

A motorcycle 1 is an example of a straddle type vehicle according to an embodiment of the present invention illustrated in FIGS. 1 to 3, and includes a front wheel and a rear wheel. The front wheel is rotatably supported by a lower portion of a front fork 2 extending in a substantially up-down direction. The front fork 2 is supported by a steering shaft 5 via an upper bracket 3 provided at the upper end of the front fork 2 and a lower bracket 4 provided below the upper bracket 3. The steering shaft 5 is rotatably supported by a head pipe 21 extending in a substantially up-down direction.

A handlebar 6 extending in the vehicle width direction is attached to the upper bracket 3. The handlebar 6 is bent so as a central portion thereof, regarding the vehicle width direction, to be further in the lower side. The handlebar 6 is attached to the upper bracket 3 by the central portion. The handlebar 6 includes a reinforcing bar 7 extending in the vehicle width direction above the central portion, regarding the vehicle width direction. The rider sways the handlebar 6 rightward or leftward to steer the front wheel turning about the steering shaft 5.

A meter display device 10 that displays a vehicle state, such as the vehicle speed and the engine rotational speed, is disposed in front of the handlebar 6. The meter display device 10 is formed in a substantially rectangular solid shape that is elongate in the vehicle width direction. A displaying face 11 having a substantially rectangular shape is provided in a central portion of an upper face of the meter display device 10. The displaying face 11 of the meter display device 10 is inclined upward toward the front side so as to be visually recognizable by the rider seated on a rider seat.

As illustrated in FIG. 3, the motorcycle 1 includes a vehicle body frame 20 constituting a frame of the vehicle body. The vehicle body frame 20 includes the head pipe 21 constituting a front portion of the vehicle body frame 20 and extending in a substantially up-down direction, upper frame members 22 extending rearward from an upper side of the head pipe 21, and lower frame members 23 extending downward from a lower side of the head pipe 21 and then extending rearward. The vehicle body frame 20 also includes a rear frame member that interconnects rear ends of the upper frame members 22 and rear ends of the lower frame members 23.

An engine is mounted in a space surrounded by the upper frame members 22, the lower frame members 23, and the rear frame member. A fuel tank 9 is disposed above the upper frame members 22 and the rear frame members, and the rider seat is disposed rearward of the fuel tank 9. The rider seat is supported from below by a seat frame extending rearward from the rear frame member.

The motorcycle 1 includes a meter panel 30 that accommodates the meter display device 10 and forms an outer shell covering the periphery of the meter display device 10. The meter panel 30 includes a meter panel front portion 31 disposed forward of the upper bracket 3 and extending in the front-rear direction, and a pair of meter panel side portions 32 disposed on both sides, regarding the vehicle width direction, of the upper bracket 3 and extending rearward from both sides, regarding vehicle width direction, of the meter panel front portion 31.

Figure 7:
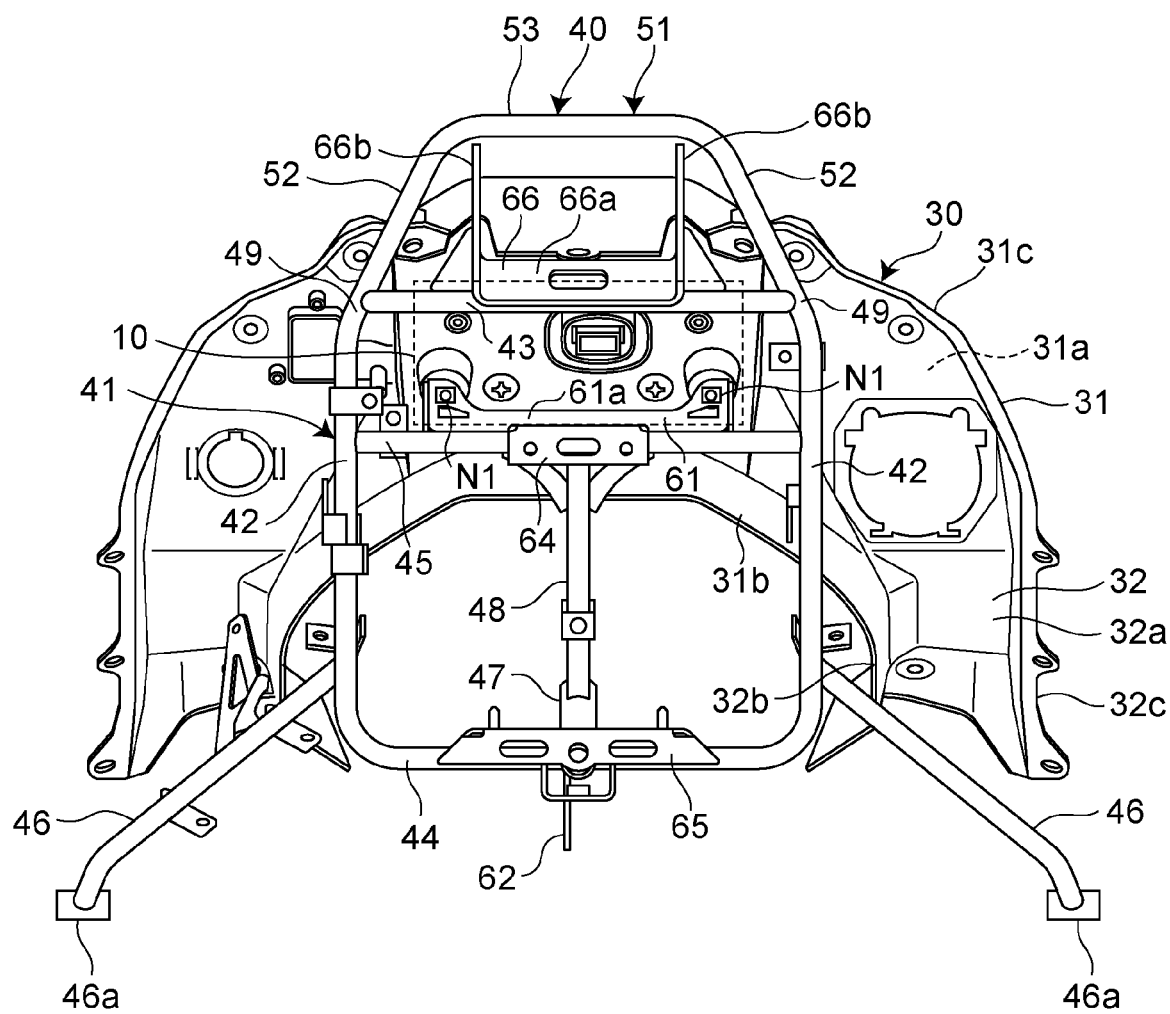
FIG. 7 is a front view illustrating the meter panel and the meter support member.

As illustrated in FIGS. 1 and 7 to be described later, the meter panel front portion 31 includes an upper face portion 31a that is inclined upward toward the front side and extends in the front-rear direction, an inner face portion 31b that extends downward from the inner side, regarding the vehicle body, of the upper face portion 31a, and an outer face portion 31c that extends downward from the outer side, regarding the vehicle body, of the upper face portion 31a. The meter panel front portion 31 is formed to have a U-shaped cross section opened to the lower side.

Each of the meter panel side portions 32 on both sides includes an upper face portion 32a extending in a substantially horizontal direction, an inner face portion 32b extending downward from the inner side, regarding the vehicle body, of the upper face portion 32a, and an outer face portion 32c extending downward from the outer side, regarding the vehicle body, of the upper face portion 32a. Each of the meter panel side portions 32 is formed to have a U-shaped cross section opened to the lower side. In the meter panel 30, the meter panel front portion 31 and the meter panel side portions 32 on both sides are integrally formed.

Figure 4:
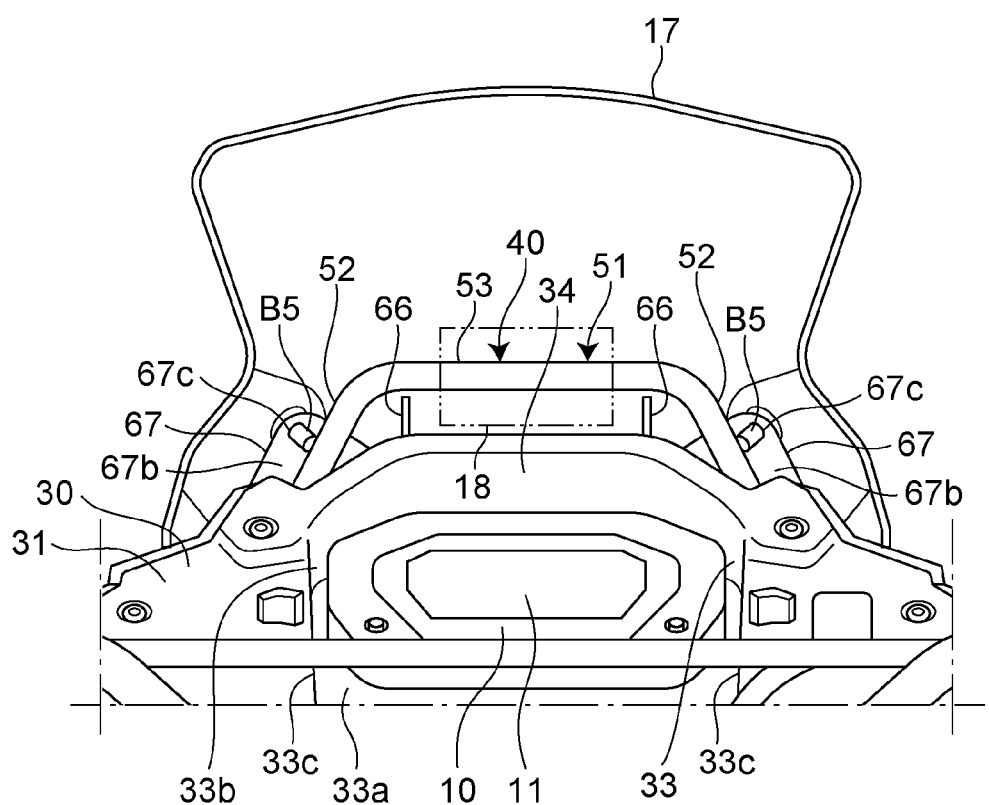
FIG. 4 is an enlarged view of the meter display device illustrated in FIG. 2 and peripheral portions thereof.
Figure 5:
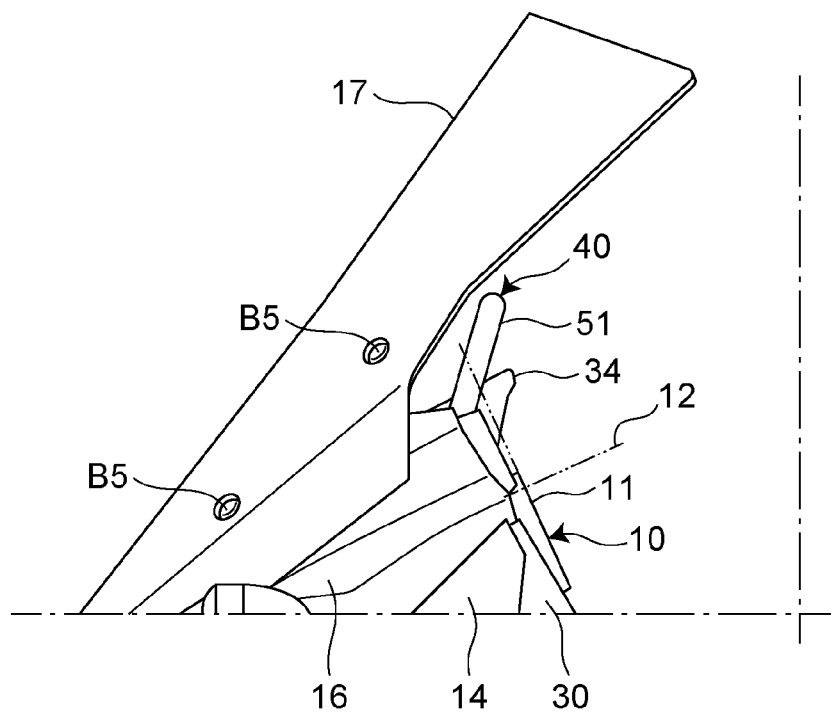
FIG. 5 is an enlarged view of the meter display device illustrated in FIG. 3 and peripheral portions thereof.

FIG. 4 is an enlarged view of the meter display device 10 illustrated in FIG. 2 and the peripheral portions thereof. FIG. 5 is an enlarged view of the meter display device 10 illustrated in FIG. 3 and the peripheral portions thereof. As illustrated in FIG. 4, the meter panel front portion 31 includes a meter housing portion 33 in a central portion thereof, regarding the vehicle width direction, to accommodate the meter display device 10. The meter housing portion 33 is recessed downward and has a substantially rectangular shape complying with the shape of the meter display device 10.

The meter housing portion 33 includes a bottom wall portion 33a, a front wall portion 33b extending upward from the front side of the bottom wall portion 33a, and side wall portions 33c extending upward from both sides, regarding the vehicle width direction, of the bottom wall portion 33a. The meter panel front portion 31 forms an outer shell that covers the periphery of the meter display device 10 disposed in the meter housing portion 33. The periphery of the meter display device 10 is, specifically, the front side and both sides of the meter display device 10.

As illustrated in FIGS. 4 and 5, the meter panel front portion 31 includes a visor 34 in front of the meter display device 10. The visor 34 protrudes upward further than the displaying face 11 of the meter display device 10 along a normal direction 12 of the displaying face 11. The visor 34 is provided on the upper side of the meter display device 10 and protrudes in the upper side from the front wall portion 33b of the meter housing portion 33.

The visor 34 is formed to protrude in a trapezoidal shape in a rear view. The upper edge portion of the visor 34 is such that a central portion thereof, regarding the vehicle width direction, extends linearly in the vehicle width direction, and both outer portions thereof, regarding the vehicle width direction, extend diagonally downward toward the outer sides, regarding the vehicle width direction. The visor 34 improves visibility of the displaying face 11 by preventing sunlight or the like from reflecting on the displaying face 11 of the meter display device 10.

The meter panel 30 is supported together with the meter display device 10 on the vehicle body frame 20 by a meter support member 40 that supports the meter display device 10 on the vehicle body frame 20.

Figure 6:
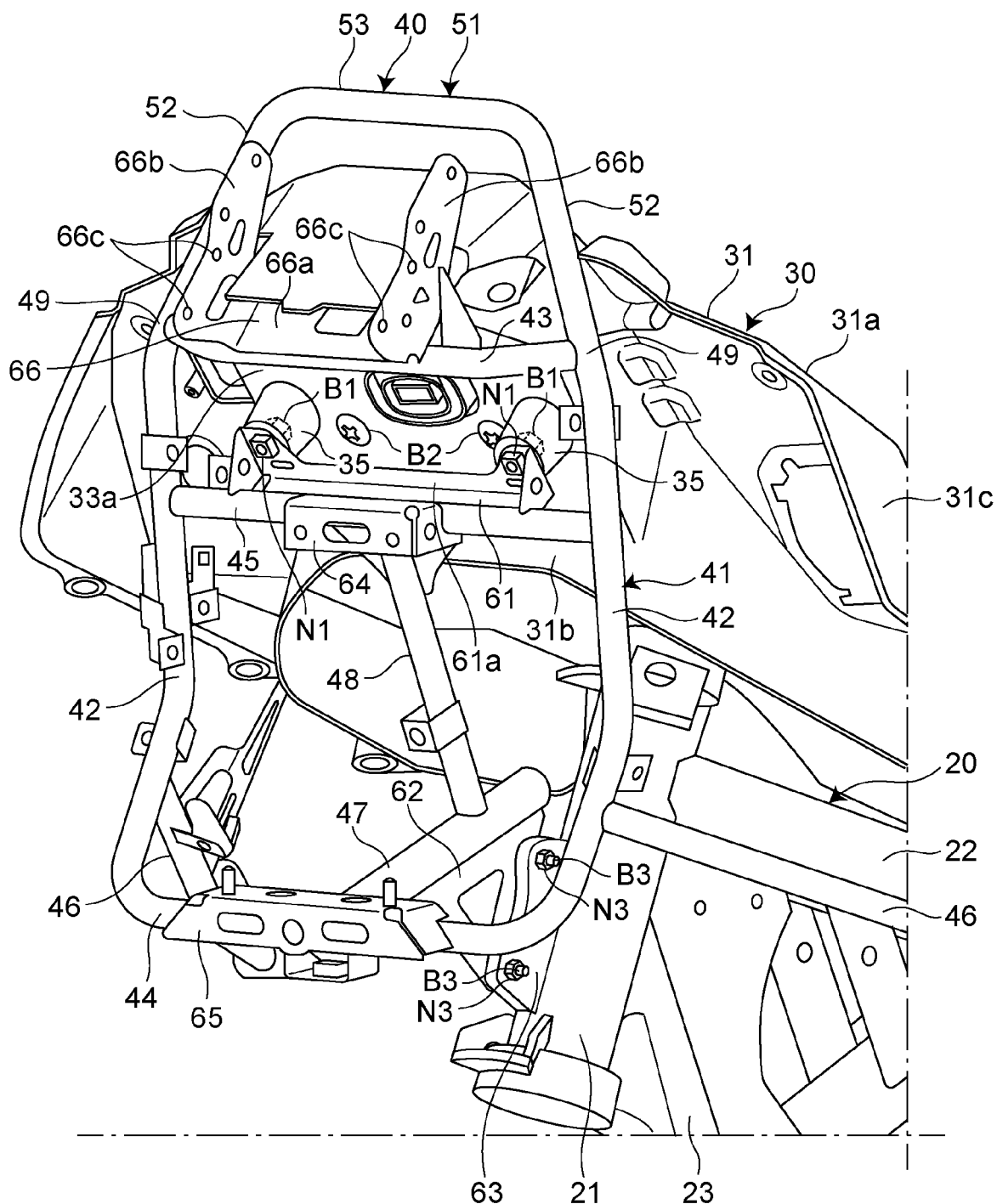
FIG. 6 is a perspective view illustrating a meter panel and a meter support member.

FIG. 6 is a perspective view illustrating the meter panel 30 and the meter support member 40. FIG. 7 is a front view illustrating the meter panel 30 and the meter support member 40. The vehicle body frame 20 to which the meter support member 40 is attached is also illustrated in FIG. 6. As illustrated in FIGS. 6 and 7, the meter support member 40 includes a main body 41 that is disposed below the meter panel 30, supports the meter display device 10, and is attached to the vehicle body frame 20, and an exposed portion 51 joined to the main body 41 below the meter panel 30 and exposed above the meter panel 30. The main body 41 and the exposed portion 51 of the meter support member 40 are integrally formed to have a one-piece construction by welding or the like.

The main body 41 of the meter support member 40 is formed of a bar-like member such as a metal pipe, and includes a pair of outer frame portions 42 that are provided on both outer sides, regarding the vehicle width direction, of the meter display device 10 and extend in the up-down direction, an upper frame portion 43 extending across upper portions of a pair of outer frame portions 42 in the vehicle width direction, a lower frame portion 44 extending across lower portions of a pair of outer frame portions 42 in the vehicle width direction, and a middle frame portion 45 extending across central portions, regarding the up-down direction, of a pair of outer frame portions 42 in the vehicle width direction.

The main body 41 of the meter support member 40 also includes a pair of first rear extension portions 46 extending rearward from a pair of outer frame portions 42, the first rear extension portions being directed outward, regarding the vehicle width direction, toward the rear side, a second rear extension portion 47 extending rearward from the central portion, regarding the vehicle width direction, of the lower frame portion 44, and a connecting portion 48 that extends in the up-down direction to interconnect the second rear extension portion 47 and the central portion, regarding the vehicle width direction, of the middle frame portion 45.

A mounting bracket 61 to which the meter display device 10 is mounted is fixed to the middle frame portion 45 of the main body 41. In the embodiment, the mounting bracket 61 is fixed by welding. The mounting bracket 61 includes a mounting face 61a that is inclined upward toward the front side and extends in the vehicle width direction. Bolt insertion holes for mounting the meter panel 30 is formed in the mounting face 61a to be located on both sides, regarding the vehicle width direction.

On the lower face of the bottom wall portion 33a of the meter panel 30, a pair of attachment bosses 35 each protruding in a truncated cone shape is formed on both outer sides thereof, regarding the vehicle width direction. A fastening bolt B1 is embedded in each of the attachment bosses 35. The meter panel 30 is attached to the main body 41 of the meter support member 40 by screwing nuts N1 on the fastening bolts B1 embedded in the attachment bosses 35 with the fastening bolts B1 inserted in the bolt insertion holes formed in the mounting face 61a of the mounting bracket 61.

In the meter display device 10, screw holes are formed on both sides, regarding the vehicle width direction, of the bottom face portion opposite to the displaying face 11. Bolt insertion holes are formed in the lower face of the bottom wall portion 33a of the meter panel 30 so as to correspond to the screw holes. As illustrated in FIG. 6, the meter display device 10 is attached to the meter panel 30 by screwing fastening bolts B2 in the screw holes of the meter display device 10 through the bolt insertion holes of the meter panel 30. The meter display device 10 is supported together with the meter panel 30 on the vehicle body frame 20.

As illustrated in FIG. 7, a boss portion 46a is formed on a rear end portion of each of a pair of first rear extension portions 46 of the main body 41. The boss portion 46a extends in a cylindrical shape in the vehicle width direction.

A mounting bracket 62 to be attached to the vehicle body frame 20 is fixed to the second rear extension portion 47 of the main body 41. The mounting bracket 62 is formed so as to protrude downward from the second rear extension portion 47 in a triangular shape in a side view. Bolt insertion holes are formed on both sides, regarding the up-down direction, of the rear portion of the mounting bracket 62.

A mounting bracket 63 to which the meter support member 40 is mounted is fixed to the head pipe 21 of the vehicle body frame 20. The mounting bracket 63 is formed so as to protrude forward from the head pipe 21. Bolt insertion holes are formed on both sides, regarding the up-down direction, of the mounting bracket 63 so as to correspond to the bolt insertion holes of the mounting bracket 62.

In the meter support member 40, the second rear extension portion 47 is attached to the head pipe 21 and thereby attached to the vehicle body frame 20 by screwing the fastening bolts B3 from the right side, regarding the vehicle width direction, in the nuts N3 provided on the left side of the vehicle body through the bolt insertion holes of the mounting bracket 62 and the bolt insertion hole of the mounting bracket 63.

Mounting brackets 64 and 65 to which a light unit including a headlight is mounted are fixed to the middle frame portion 45 and the lower frame portion 44 of the main body 41. An upper side of a rear portion of the light unit is mounted to the mounting bracket 64 fixed to the middle frame portion 45 by using a fastening member, and a lower side of the rear portion of the light unit is mounted to the mounting bracket 65 fixed to the lower frame portion 44 by using a fastening member.

First mounting bracket 66 to which a windshield 17 is mounted is fixed to the upper frame portion 43 of the main body 41. The windshield 17 is disposed above the front cowl 16 covering the front portion of the vehicle body from the front side of the vehicle body to protect the rider from traveling wind and the like.

The first mounting bracket 66 includes a bottom face portion 66a fixed to the upper frame portion 43, extending in the vehicle width direction, and inclined upward toward the rear side, and upright face portions 66b extending upward from both sides, regarding the vehicle width direction, of the bottom face portion 66a in a direction orthogonal to the vehicle width direction with the rear portion of the upright face portion 66b extending upward toward the rear side. Bolt insertion holes 66c spaced apart along the front-rear direction are formed in the upright face portion 66b of the first mounting bracket 66.

Figure 8:
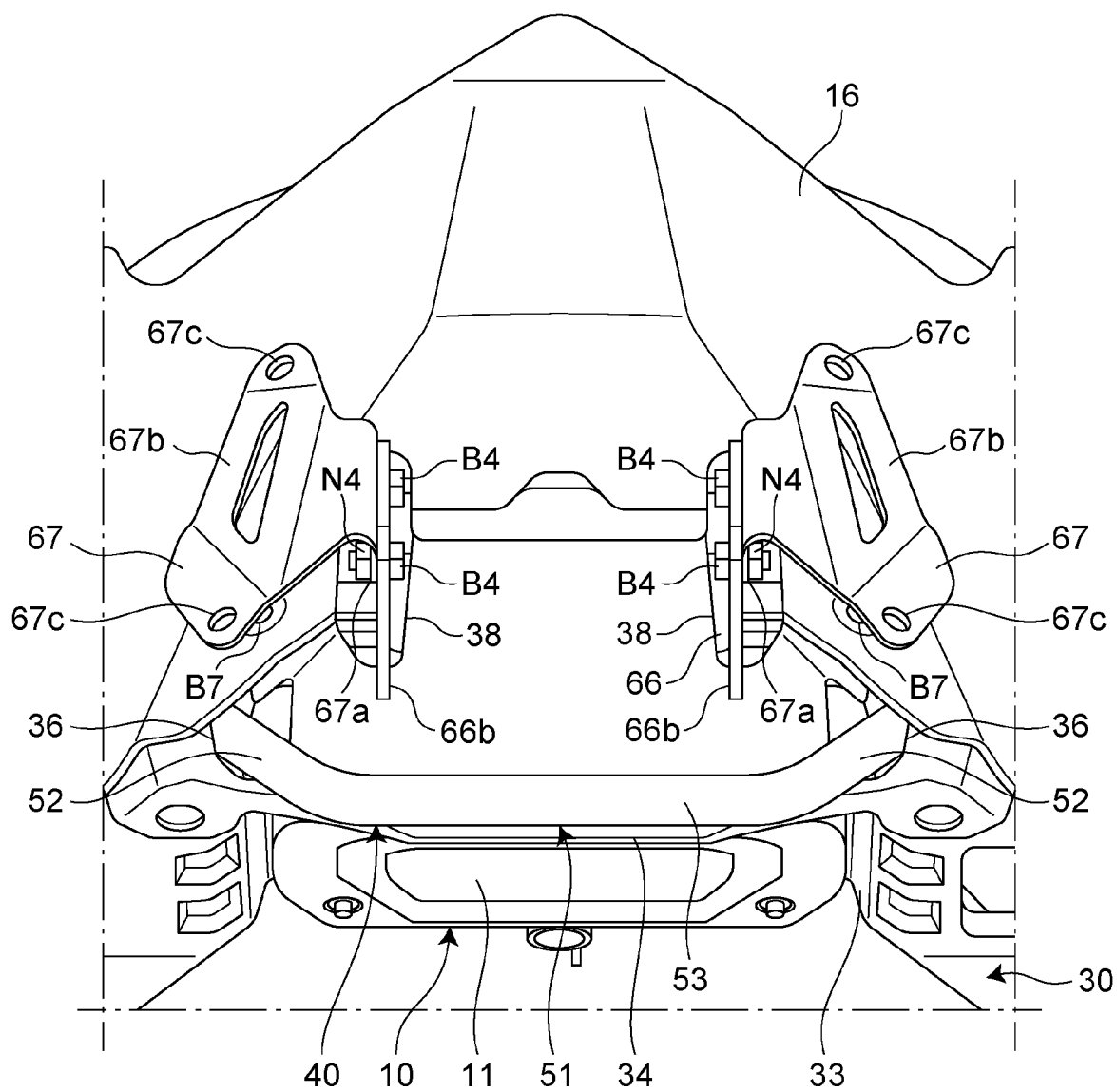
FIG. 8 is a top view illustrating the meter panel, the meter support member, and a front cowl.

FIG. 8 is a top view illustrating the meter panel 30, the meter support member 40, and the front cowl 16. As illustrated in FIG. 8, a second mounting bracket 67 is attached to each of the upright face portions 66b on both sides of the first mounting bracket 66. The second mounting bracket 67 includes an upright face portion 67a extending in a direction orthogonal to the vehicle width direction, and a mounting face portion 67b extending outward, regarding the vehicle width direction, from the upper side of the upright face portion 67a and inclined to be directed downward toward the outer side, regarding the vehicle width direction.

In the upright face portion 67a of the second mounting bracket 67, bolt insertion holes are formed spaced apart from each other along the front-rear direction so as to correspond to the bolt insertion holes 66c of the first mounting bracket 66, and nuts N4 corresponding to the bolt, insertion holes are welded. Attachment holes 67c spaced apart from each other along the front-rear direction are formed in the mounting face portion 67b of the second mounting bracket 67.

The second mounting bracket 67 is attached to the first mounting bracket 66 by screwing the fastening bolts B4 from the inner side, regarding the vehicle width direction, in the nuts N4 through the bolt insertion holes 66c of the first mounting bracket 66 and the bolt insertion holes of the second mounting bracket 67. The first mounting brackets 66 and the second mounting brackets 67 on both sides, regarding the vehicle width direction, are formed to be symmetrical in the vehicle width direction.

In the windshield 17, bolt insertion holes spaced apart from each other along the front-rear direction are formed on both sides thereof, regarding the vehicle width direction, so as to correspond to the attachment holes 67c of the second mounting bracket 67. As illustrated in FIGS. 4 and 5, the windshield 17 is attached to the second mounting brackets 67 and thereby attached to the meter support member 40 by fastening the fastening bolts B5 from above in the attachment holes 67c of the second mounting bracket 67 through the bolt insertion holes of the windshield 17.

The exposed portion 51 of the meter support member 40 formed of a bar-like member, such as a metal pipe, has a portion extending in the vehicle width direction and portions on both sides thereof, regarding the vehicle width direction, extending downward to be joined to the main body 41, specifically, to a pair of outer frame portions 42 below the meter panel 30. Both sides, regarding the vehicle width direction, of the exposed portion 51 are each inclined outward, regarding the vehicle width direction, toward the lower side. The outer frame portions 42 and the exposed portion 51 of the main body 41 of the meter support member 40 are formed of bar-shaped metal pipes having the same cross section.

As illustrated in FIGS. 6 and 7, the exposed portion 51 of the meter support member 40 includes a pair of protruding portions 52 that extends upward beyond the meter panel 30 from joints 49 where a pair of outer frame portions 42 of the main body 41 and a pair of protruding portions 52 join, and an extension portion 53 that is bent from a pair of protruding portions 52 and extends in a direction orthogonal to the up-down direction.

As illustrated in FIG. 4, the exposed portion 51 has a pair of protruding portions 52 and the extension portion 53 disposed around the meter display device 10. As illustrated in FIG. 5, the exposed portion 51 is disposed above and separated from the upper side of the visor 34, and forward of a rear end of the visor 34.

As illustrated in FIG. 4, the exposed portion 51 is formed in a trapezoidal shape separately along the periphery of the upper end of the visor 34. The exposed portion 51 is such that the extension portion 53 provides a linear portion 53 extending linearly in the vehicle width direction on the front-upper side of the meter display device 10, and a pair of protruding portions 52 provides inclined portions 52 on both sides, regarding the vehicle width direction, of the linear portion 53, the inclined portions 52 inclining to be directed outward, regarding the vehicle width direction, toward the lower side.

As illustrated in FIG. 7, the extension portion 53 of the exposed portion 51 disposed above the meter panel 30 and extending in the vehicle width direction is formed to have a shorter length in the vehicle width direction than the upper frame portion 43, the middle frame portion 45, and the lower frame portion 44 of the main body 41 disposed below the meter panel 30 and extending in the vehicle width direction.

In the motorcycle 1, the exposed portion 51 of the meter support member 40 protruding upward beyond the meter panel 30 and extending linearly in the vehicle width direction on the front-upper side of the meter display device 10 serves as an accessory stay to which an accessory 18 (see FIG. 4) such as a navigation device or a mobile terminal device can be mounted. The accessory may be mounted to the accessory stay via a clamp member and a holder member.

The accessory may be a display device such as a navigation device and a mobile terminal device, an imaging device such as a camera that images the surroundings of the vehicle, or an antenna device for transmitting and receiving radio waves for ETC or GPS. In addition, various accessories such as an auxiliary light, a power plug, and an add-on switch may be attached.

Since the exposed portion 51 of the meter support member 40 provides the accessory stay extending linearly in the vehicle width direction on the front-upper side of the meter display device 10, the accessory 18 can be relatively easily and stably mounted to the accessory stay in the vicinity of the meter display device 10. As compared with a case where the accessory is mounted rearward of the meter display device 10, the movement of the line of sight of the rider when viewing the accessory 18 is small, which improves comfort in riding.

Since the accessory stay provided by the exposed portion 51 of the meter support member 40 is formed along the upper end of the visor 34 with the linear portion 53 and the inclined portions 52 on both sides, a space for mounting the accessory 18 is provided by the linear portion 53 disposed on the central portion of the accessory stay, regarding the vehicle width direction, which is easily recognized by the rider, and at the same time a chance of the accessory stay blocking the view of the rider is suppressed.

Since the exposed portion 51 of the meter support member 40 serving as the accessory stay is provided on the meter support member 40, the exposed portion 51 can be disposed close to the meter display device 10 regardless of where the windshield 17 is positioned.

The accessory stay provided by the exposed portion 51 of the meter support member 40 is disposed rearward of the windshield 17. The windshield 17 protects the accessory 18 mounted to the accessory stay, hindering the traveling air or the like from acting on the accessory 18.

The main body 41 of the meter support member 40 is disposed below the meter panel 30 and serves as a cowl stay attached to the vehicle body frame 20 to support the front cowl 16. The front cowl 16 is attached to the meter panel 30 and supported by the main body 41 of the meter support member 40 by securing attachment members B7 to attachment holes 39 in flanges provided forward of the meter panel 30 illustrated in FIG. 9 to be described later.

The accessory stay provided by the exposed portion 51 of the meter support member 40 extends upward from the cowl stay provided by the main body 41 of the meter support member 40 and is integrally formed with the cowl stay. This reduces the number of parts and the number of attaching steps as compared with a case where the accessory stay and the cowl stay are formed separately, and enables the accessory stay to be firmly connected to the vehicle body frame 20.

Figure 9:
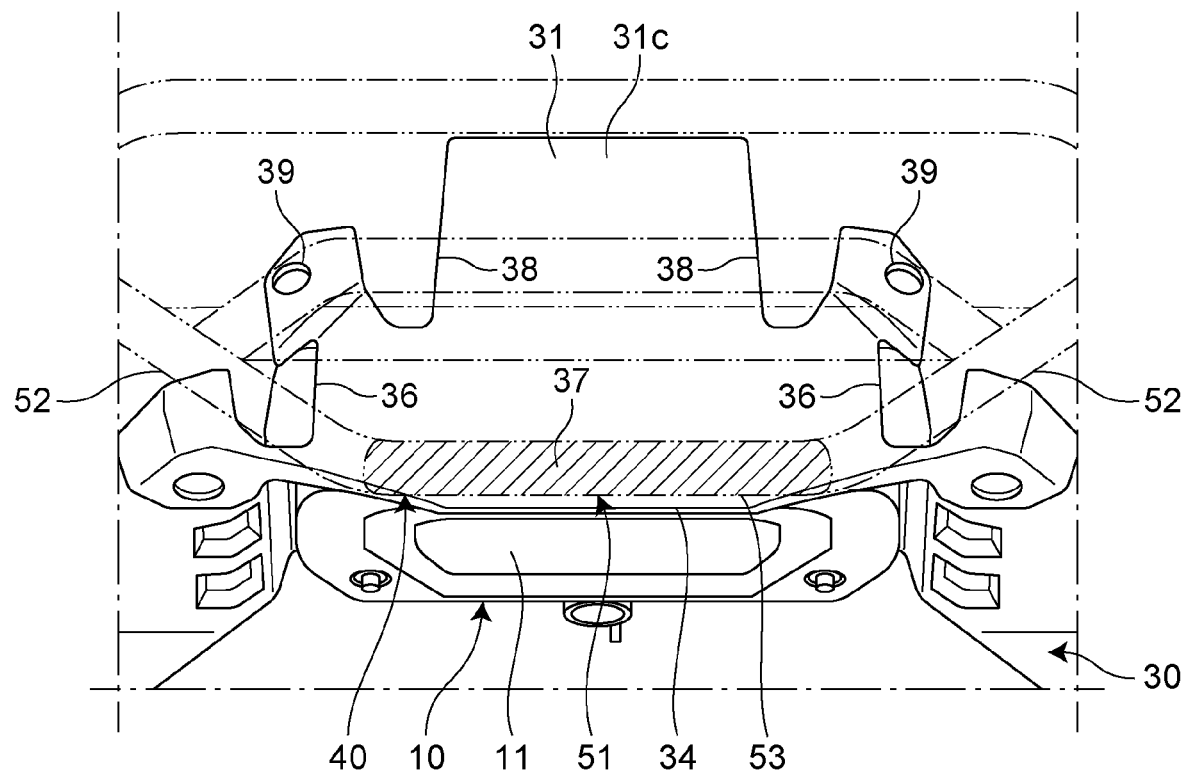
FIG. 9 is a top view illustrating the meter panel.

FIG. 9 is a top view illustrating the meter panel 30 illustrated in FIG. 8. As illustrated in FIG. 9, the meter panel 30 is provided with a pair of cutouts 36 through which a pair of protruding portions 52 of the exposed portion 51 of the meter support member 40 penetrates in the up-down direction, and an overlapping portion (hatched portion) 37 that overlaps, in the up-down direction, the extension portion 53 of the exposed portion 51 of the meter support member 40.

Each of a pair of cutouts 36 provided in the meter panel 30 is opened to the front side of the meter panel 30. This allows the protruding portion 52 of the exposed portion 51 of the meter support member 40 to be set in the cutout 36 of the meter panel 30 from the front side, thereby positioning the protruding portion 52 to penetrate the cutout 36 in the up-down direction.

In a state where the meter panel 30 is supported by the meter support member 40 in this manner, the front cowl 16 is attached to the front side of the meter panel 30, and a pair of right and left side cowls 14 is attached to both sides, regarding the vehicle width direction, of the meter panel 30.

The front cowl 16 is tapered toward the front side with a light opening formed in the distal end thereof. A headlight is disposed in the light opening with the front cowl 16 covering the periphery of the headlight. As described above, the light unit including the headlight is attached to the main body 41 of the meter support member 40.

The side cowls 14 are disposed rearward of the outer sides, regarding the vehicle width direction, of the front cowl 16. The side cowls 14 extend in the up-down direction and diagonally downward toward the rear side in a side view to cover, from the outer sides regarding the vehicle width direction, the vehicle body frame 20, the engine disposed in the vehicle body frame 20, and the like.

The side cowls 14 are disposed on the outer sides, regarding the vehicle width direction, of the front cowl 16 and the meter panel 30. The side cowls 14 are disposed on the outer sides, regarding the vehicle width direction, of the meter panel 30 to cover the rearward of the outer sides, regarding the vehicle width direction, of the front cowl 16. As illustrated in FIG. 2, the side cowls 14 are fixed to the meter panel side portions 32 by fastening bolts B6, and thereby attached to the outer side, regarding the vehicle width direction, of the meter panel 30.

In front of the meter panel 30, as described above, the windshield 17 is disposed above the front cowl 16. The windshield 17 has a form of a left-right symmetric plate-like shape, and is disposed so as to be inclined upward from the front side to the rear side. The windshield 17 is formed in a curved shape in which a central portion thereof, regarding vehicle width direction, bulges further to the front side than both side portions thereof, regarding the vehicle width direction.

The windshield 17 is formed to be larger than the meter display device 10 in the vehicle width direction, and is detachably attached to the meter support member 40. The windshield 17 is made of a transparent resin material to provide visibility to the rider.

In the motorcycle 1, the vehicle body frame 20 is formed from a metal material, such as a steel material, into a hollow shape having a closed cross section. The meter support member 40 is formed from a metal material, such as an aluminum material, into a hollow bar-shape having a closed cross section. Each of the meter panel 30, the front cowl 16, and the side cowl 14 is formed from a resin material into a plate-like shape, and the outer surface thereof is painted.

The exposed portion of the meter support member 40 may be painted or surface-treated differently from portions other than the exposed portion. In such a case, treatment on the portion hidden below the meter panel 30 may be omitted so that an extra cost for treatment can be reduced while improving aesthetic appearance.

As described above, the straddle type vehicle according to the embodiment includes the meter display device 10 that displays the vehicle state, the meter panel 30 that forms the outer shell covering the periphery of the meter display device 10, and the meter support member 40 that supports the meter display device 10 on the vehicle body frame 20. The meter support member 40 includes a main body 41 disposed below the meter panel 30, supporting the meter display device 10, and attached to the vehicle body frame 20, and an exposed portion 51 joined to the main body 41, exposed above the meter panel 30, and disposed around the meter display device 10.

Accordingly, the exposed portion 51 of the meter support member 40 can be used as an accessory mount portion to which the accessory 18 (as illustrated in FIG. 4, for example) is additionally mounted after purchasing the vehicle, and the configuration around the meter display device 10 can be simplified as compared with a case where a support member for attachment is additionally provided around the meter display device 10.

The main body 41 of the meter support member 40 has a pair of outer frame portions 42 that is provided on both outer sides, regarding the vehicle width direction, of the meter display device 10 and extends in the up-down direction, and the exposed portion 51 of the meter support member 40 is formed in a bar-shape and includes the portion extending in the vehicle width direction and portions in both sides, regarding the vehicle width direction, extending downward to be joined to a pair of outer frame portions 42 below the meter panel 30. Accordingly, both sides, regarding in the vehicle width direction, of the exposed portion 51 of the meter support member 40 extending in the vehicle width direction can be supported, and thereby support is provided with high rigidity, as compared with a case where the exposed portion 51 of the meter support member 40 is supported by one side thereof, regarding the vehicle width direction.

Furthermore, both sides, regarding the vehicle width direction, of the exposed portion 51, are each inclined outward, regarding the vehicle width direction, toward the lower side. Accordingly, as compared with a case where both sides, regarding the vehicle width direction, of the exposed portion 51 are not inclined outward, regarding the vehicle width direction, toward the lower side, the length of the central portion, regarding the vehicle width direction, of the exposed portion 51 extending in the vehicle width direction is short, which may simplify the configuration around the meter display device 10. When the accessory 18 is mounted to the central portion, regarding the vehicle width direction, of the exposed portion 51 of the meter support member 40 and thereby a load acts on the exposed portion 51, the bending moment acting on both sides, regarding the vehicle width direction, of the exposed portion 51 is small, which means that deformation of the exposed portion 51 of the meter support member 40 is effectively suppressed.

The outer frame portions 42 and the exposed portion 51 are formed in bar-shapes having the same cross section. This enables the outer frame portions 42 and the exposed portion 51 to be integrally formed by bending a bar-like member having a constant cross section, and the number or parts and the number of attaching steps can be reduced as compared with a case where the outer frame portions 42 and the exposed portion 51 of the meter support member 40 are separately formed and then joined.

In addition, the exposed portion 51 includes a pair of protruding portions 52 that extends upward beyond the meter panel 30 from the joints 49 where a pair of outer frame portions 42 of the main body 41 and a pair of protruding portions 52 join, and the extension portion 53 that is bent from a pair of protruding portions 52 and extends in a direction orthogonal to the up-down direction, and the meter panel 30 has the cutouts 36 through which a pair of protruding portions 52 penetrates in the up-down direction, and an overlapping portion 37 that overlaps the extension portion 53 in the up-down direction. Accordingly, the overlapping portion 37 hinders the space below the meter panel 30 from being seen from the upper side thereof, as compared with a case where a cutout through which a pair of protruding portions 52 and the extension portion 53 of the exposed portion 51 penetrate in the up-down direction is provided, and thus the external appearance may be improved.

The cutouts 36 of the meter panel 30 is opened to the front side of the meter panel 30. This allows the protruding portion 52 of the exposed portion 51 of the meter support member 40 to be set in the cutout 36 of the meter panel 30 from the front side of the meter panel 30, and thus the work of attaching together the meter support member 40 and the meter panel 30 can be performed easily. With regard to setting the protruding portion 52 of the exposed portion 51 of the meter support member 40 in the cutout of the meter panel 30, the size of the cutout of the meter panel 30 can be made small, as compared with a case where the meter panel 30 is provided with cutouts through which a pair of protruding portions 52 and the extension portion 53 of the exposed portion 51 of the meter support member 40 penetrate in the up-down direction.

Furthermore, the meter panel 30 includes a visor 34 that is provided above the meter display device 10 and protrudes upward further than the displaying face 11 of the meter display device 10 in the normal direction of the displaying face 11. The exposed portion 51 is separately disposed above the visor 34, and is disposed further in the front side than the rear end of the visor 34. Thus, in a case where the visor 34 is provided to improve visibility of the displaying face 11 of the meter display device 10, a space for mounting the accessory 18 is readily provided and, at the same time, deterioration in visibility caused by disposing the exposed portion 51 of the meter support member 40 closer to the rider than the visor 34 of the meter panel 30 can be prevented.

Furthermore, the meter panel 30 includes the visor 34 that is provided above the meter display device 10 and protrudes upward further than the displaying face 11 of the meter display device 10 in the normal direction of the displaying face 11, the visor 34 protrudes in a trapezoidal shape, and the exposed portion 51 is formed in a trapezoidal shape separately along the periphery of the visor 34. This provides a space for mounting the accessory 18 and can prevent the exposed portion 51 of the meter support member 40 from degrading the external appearance.

Although the motorcycle 1 has been described above in the embodiment as an example of the straddle type vehicle, the present invention is generally applicable to straddle type vehicles in which a meter display device is disposed in front of a handlebar. The present invention is also applicable to a straddle type vehicle such as a personal watercraft (PWC) and an all-terrain vehicle (ATV).

The present invention is not limited to the illustrated embodiments, and various improvements and design changes can be made without departing from the spirit of the present invention.

As described above, the straddle type vehicle according to the embodiment of the present invention has a simple configuration around a meter display device to allow an accessory to be mounted. Thus, the present invention may be suitably used in the technical field of manufacturing such types of vehicles.

What is claimed is:

1. A straddle vehicle comprising:
a meter display device configured to display a vehicle state;
a meter panel forming an outer shell covering a periphery of the meter display device; and
a meter support member configured to support the meter display device on a vehicle body frame,
wherein the meter support member includes a main body disposed below the meter panel, supporting the meter display device, and attached to the vehicle body frame, and an exposed portion joined to the main body, exposed above the meter panel, and disposed around the meter display device, and the main body and the exposed portion are integrally formed to have a one-piece construction,
wherein the main body of the meter support member includes a pair of outer frame portions on both outer sides of the meter display device with respect to a vehicle width direction, and the main body extends in an up-down direction, and
wherein the outer frame portions and the exposed portion are formed in shapes having the same cross section.

2. The straddle vehicle according to claim 1,
wherein the exposed portion of the meter support member is in a bar-shape and includes a portion extending in the vehicle width direction and portions on both sides with respect to the vehicle width direction, the portions on both sides extending downward to be joined to the pair of outer frame portions below the meter panel.

3. The straddle vehicle according to claim 2, wherein each of the both sides of the exposed portion with respect to the vehicle width direction is inclined outward with respect to the vehicle width direction toward a lower side.

4. The straddle vehicle according to claim 2, wherein the outer frame portions and the exposed portion are in bar-shapes having a same cross section.

5. The straddle vehicle according to claim 2, wherein the exposed portion includes a pair of protruding portions extending upward beyond the meter panel from joints where the pair of outer frame portions of the main body and the pair of protruding portions join, and an extension portion bent from the pair of protruding portions and extending in a direction orthogonal to the up-down direction, and
wherein the meter panel has cutouts through which the pair of protruding portions penetrates in the up-down direction, and an overlapping portion overlapping the extension portion in the up-down direction.

6. The straddle vehicle according to claim 5, wherein the cutouts of the meter panel are opened to a front side of the meter panel.

7. The straddle vehicle according to claim 1, wherein the meter panel includes a visor above the meter display device and protruding upward further than a displaying face of the meter display device in a normal direction of the displaying face, and
wherein the exposed portion is separately disposed above the visor and is disposed further in a front side than a rear end of the visor.

8. The straddle vehicle according to claim 1, wherein the meter panel includes a visor above the meter display device and protruding upward further than a displaying face of the meter display device in a normal direction of the displaying face,
wherein the visor protrudes in a trapezoidal shape, and
wherein the exposed portion is formed in a trapezoidal shape separately along a periphery of the visor.

9. A straddle vehicle comprising:
a meter display device configured to display a vehicle state;
a meter panel forming an outer shell covering a periphery of the meter display device; and
a meter support member configured to support the meter display device on a vehicle body frame,
wherein the meter support member includes a main body disposed below the meter panel, supporting the meter display device, and attached to the vehicle body frame, and an exposed portion joined to the main body, exposed above the meter panel, and disposed around the meter display device,
wherein the main body of the meter support member includes a pair of outer frame portions on both outer sides of the meter display device with respect to a vehicle width direction, and the main body extends in an up-down direction,
wherein the exposed portion of the meter support member is in a bar-shape and includes a portion extending in the vehicle width direction and portions on both sides with respect to the vehicle width direction, the portions on both sides extending downward to be joined to the pair of outer frame portions below the meter panel,
wherein the exposed portion includes a pair of protruding portions extending upward beyond the meter panel from joints where the pair of outer frame portions of the main body and the pair of protruding portions join, and an extension portion bent from the pair of protruding portions and extending in a direction orthogonal to the up-down direction, and
wherein the meter panel has cutouts through which the pair of protruding portions penetrates in the up-down direction, and an overlapping portion overlapping the extension portion in the up-down direction.

10. A straddle vehicle comprising:
a meter display device configured to display a vehicle state;
a meter panel forming an outer shell covering a periphery of the meter display device; and
a meter support member configured to support the meter display device on a vehicle body frame,
wherein the meter support member includes a main body disposed below the meter panel, supporting the meter display device, and attached to the vehicle body frame, and an exposed portion joined to the main body, exposed above the meter panel, and disposed around the meter display device,
wherein the meter panel includes a visor above the meter display device and protruding upward further than a displaying face of the meter display device in a normal direction of the displaying face, wherein the visor protrudes in a trapezoidal shape, and
wherein the exposed portion is formed in a trapezoidal shape separately along a periphery of the visor.

\* \* \* \* \*